(12) United States Patent
Yang et al.

(10) Patent No.: US 12,126,191 B2
(45) Date of Patent: Oct. 22, 2024

(54) WIRELESS CHARGING METHOD, DEVICE TO-BE-CHARGED AND WIRELESS CHARGING SYSTEM

(71) Applicant: GUANGDONG OPPO MOBILE TELECOMMUNICATIONS CORP., LTD., Guangdong (CN)

(72) Inventors: Jun Yang, Guangdong (CN); Shiming Wan, Guangdong (CN); Shangbo Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 734 days.

(21) Appl. No.: 17/353,156

(22) Filed: Jun. 21, 2021

(65) Prior Publication Data
US 2021/0313846 A1    Oct. 7, 2021

Related U.S. Application Data

(63) Continuation of application No. PCT/CN2019/072407, filed on Jan. 18, 2019.

(51) Int. Cl.
*H02J 7/00* (2006.01)
*H02J 50/10* (2016.01)
(Continued)

(52) U.S. Cl.
CPC .............. *H02J 50/90* (2016.02); *H02J 50/10* (2016.02); *H02J 50/80* (2016.02)

(58) Field of Classification Search
USPC ................ 320/106, 107, 108, 109, 110, 112
See application file for complete search history.

(56) References Cited

U.S. PATENT DOCUMENTS

| 5,831,841 A | 11/1998 | Nishino |
| 2015/0340880 A1 | 11/2015 | Kdoshim et al. |

(Continued)

FOREIGN PATENT DOCUMENTS

| CN | 104505925 | 4/2015 |
| CN | 105634144 | 6/2016 |

(Continued)

OTHER PUBLICATIONS

CNIPA, First Office Action for CN Application No. 201980076332.9, Aug. 30, 2023.
(Continued)

*Primary Examiner* — Brian Ngo
(74) *Attorney, Agent, or Firm* — Hodgson Russ LLP

(57) ABSTRACT

Disclosed are a wireless charging method, a device to-be-charged and a wireless charging system. The method can be applied to the wireless charging system, which includes the device to-be-charged and a wireless charging device. The device to-be-charged includes a wireless receiver circuit and a battery. The wireless receiver circuit is configured to receive an electromagnetic signal transmitted by the wireless charging device, and convert the electromagnetic signal into an output current to charge the battery. The method includes: determining, according to a detected actual output voltage of the wireless receiver circuit, whether the device to-be-charged and the wireless charging device are misaligned with each other during a wireless charging process; and setting a target output voltage of the wireless receiver circuit as the actual output voltage, in response to determining that the device to-be-charged and the wireless charging device are misaligned with each other.

20 Claims, 5 Drawing Sheets

(51) Int. Cl.
*H02J 50/80* (2016.01)
*H02J 50/90* (2016.01)

(56) References Cited

U.S. PATENT DOCUMENTS

2016/0218520 A1    7/2016  Gustavo et al.
2016/0352155 A1*  12/2016  Iwasaki .................. H02J 50/12
2017/0331299 A1   11/2017  Gao et al.

FOREIGN PATENT DOCUMENTS

| CN | 105900314 | 8/2016 |
| CN | 106560674 | 4/2017 |
| CN | 107666172 | 2/2018 |
| CN | 107834710 | 3/2018 |
| CN | 108649716 | 10/2018 |
| CN | 108725239 | 11/2018 |

OTHER PUBLICATIONS

EPO, European Search Report issued for EP Application No. 19910441.5, Nov. 24, 2021.
EPO, Communication for EP Application No. 19910441.5, Dec. 2, 2022.
WIPO, International Search Report for PCT/CN2019/072407, Sep. 26, 2019.

* cited by examiner

10

| determine, according to a detected actual output voltage of a wireless receiver circuit in a device to-be-charged, whether the device to-be-charged is misaligned with a wireless charging device during a wireless charging process | S102 |

↓

| set a target output voltage of the wireless receiver circuit in the device to-be-charged as the actual output voltage of the wireless receiver circuit, in response to determining that the device to-be-charged is misaligned with the wireless charging device during the wireless charging process | S104 |

FIG. 3

WIRELESS CHARGING METHOD, DEVICE TO-BE-CHARGED AND WIRELESS CHARGING SYSTEM

CROSS REFERENCE TO RELATED APPLICATION

This application is a continuation of International Application No. PCT/CN2019/072407, filed on Jan. 18, 2019, the entire disclosure of which is incorporated herein by reference.

TECHNICAL FIELD

The present disclosure relates to wireless charging technologies, and particularly to a wireless charging method, a device to-be-charged and a wireless charging system.

BACKGROUND

With the population of wireless charging technologies, more and more electronic devices support a function of wireless charging or wireless transmission. In the process of wireless charging or wireless transmission, if a device to-be-charged and a wireless charging dock are misaligned with each other, the energy provided by the wireless charging dock to the device to-be-charged will be insufficient, and the device to-be-charged will occupy the communication channel all the time to request the wireless charging dock to increase a transmit power thereof. This situation not only causes a waste of the communication channel resources, but also affects the normal operation of Foreign Object Detection (FOD).

The above information disclosed in the background is only used to facilitate understanding of the background of the present disclosure, hence it may include information that does not constitute the prior art known by those of ordinary skill in the art.

BRIEF DESCRIPTION OF THE DRAWINGS

By describing the exemplary embodiments in detail with reference to the drawings, the above and other objects, characteristics and advantages of the present disclosure can be clearer.

FIG. 3 is a flowchart of a wireless charging method illustrated according to an exemplary embodiment;

DETAILED DESCRIPTION OF PREFERRED EMBODIMENTS

Figure 1:
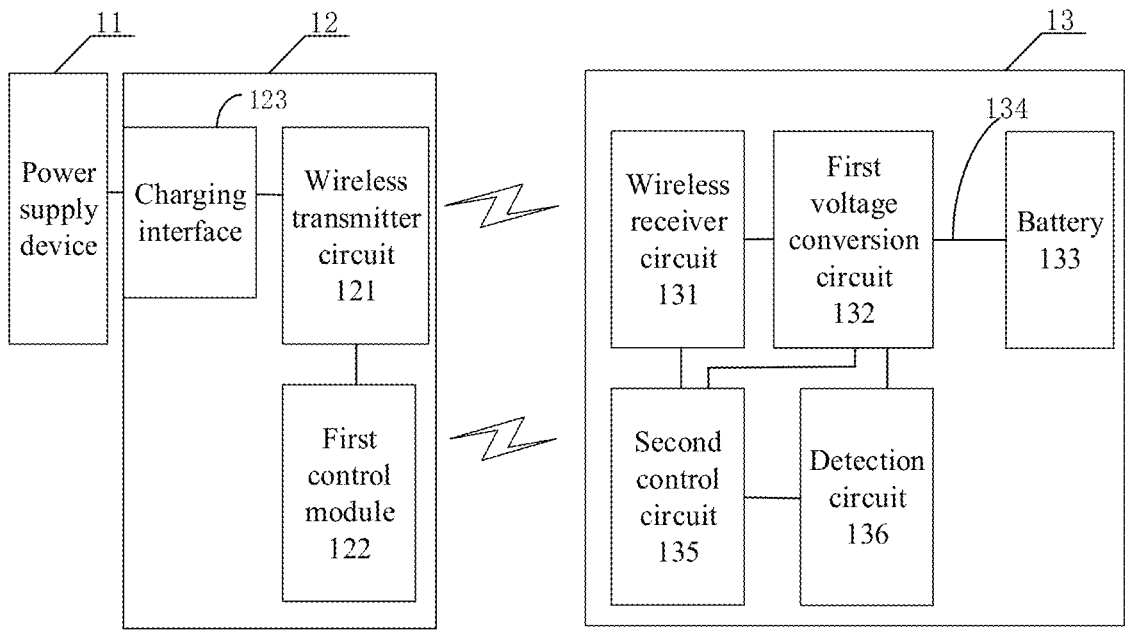
FIG. 1 is a systematic structural diagram of a wireless charging system illustrated according to an exemplary embodiment.

According to an aspect of the present disclosure, a wireless charging method is provided, which can be applied to a device to-be-charged. The device to-be-charged includes a wireless receiver circuit and a battery. The wireless receiver circuit is configured to receive an electromagnetic signal transmitted by the wireless charging device and convert the electromagnetic signal into a direct current to charge the battery. The wireless charging method includes: determining, according to a detected actual output voltage of the wireless receiver circuit in the device to-be-charged, whether the device to-be-charged and the wireless charging device are misaligned with each other during a wireless charging process; and setting a target output voltage of the wireless receiver circuit in the device to-be-charged as being equal to the actual output voltage when the device to-be-charged and the wireless charging device are misaligned with each other.

According to an implementation of the present disclosure, the determining, according to a detected actual output voltage of the wireless receiver circuit in the device to-be-charged, whether the device to-be-charged and the wireless charging device are misaligned with each other during a wireless charging process includes: detecting the actual output voltage; determining a difference between the target output voltage and the actual output voltage; feeding back the difference to the wireless charging device when the difference is greater than a preset difference threshold; and determining the device to-be-charged and the wireless charging device are misaligned with each other when the difference is not equal to the difference threshold for m times in a row, where m is a positive integer greater than 1.

According to an implementation of the present disclosure, after setting the target output voltage of the wireless receiver circuit in the device to-be-charged as being equal to the actual output voltage, the method further includes: detecting the actual output voltage; determining the difference between the target output voltage and the actual output voltage; feeding back the difference to the wireless charging device when the difference is greater than the difference threshold; and setting the target output voltage of the wireless receiver circuit in the device to-be-charged as being equal to the actual output voltage when the difference is not equal to the difference threshold for n times in a row, where n is a positive integer greater than 1.

According to an implementation of the present disclosure, when the difference is equal to the difference threshold for n times in a row, the method further includes: detecting an output current of the wireless receiver circuit in the device to-be-charged; determining whether the output current satisfies a condition of entering a current-and-voltage adaptive procedure; and performing voltage-rising and current-decreasing operations in the current-and-voltage adaptive procedure when the output current satisfies the condition of entering the current-and-voltage adaptive procedure.

According to an implementation of the present disclosure, after performing voltage-rising and current-decreasing operations in the current-and-voltage adaptive procedure, the method further includes: detecting the actual output voltage; determining the difference between the target output voltage and the actual output voltage; feeding back the difference to the wireless charging device when the difference is greater than the difference threshold; and decreasing a charging current applied to both ends of the battery in the device to-be-charged when the difference is not equal to the difference threshold for x times in a row, where x is a positive integer greater than 1.

According to an implementation of the present disclosure, after decreasing the charging current applied to both ends of the battery in the device to-be-charged, the method further includes: detecting the actual output voltage; determining the difference between the target output voltage and the actual output voltage; feeding back the difference to the wireless charging device when the difference is greater than the difference threshold; and setting the target output voltage of the wireless receiver circuit in the device to-be-charged as being equal to the actual output voltage when the difference is not equal to the difference threshold for y times in a row, where y is a positive integer greater than 1.

According to an implementation of the present disclosure, when the difference is equal to the difference threshold for y times in a row, the method further includes: increasing the charging current applied to both ends of the battery in the device to-be-charged.

According to an implementation of the present disclosure, after increasing the charging current applied to both ends of the battery in the device to-be-charged, the method further includes: detecting the actual output voltage; determining the difference between the target output voltage and the actual output voltage; feeding back the difference to the wireless charging device when the difference is greater than the difference threshold; and continuing to increase the charging current applied to both ends of the battery in the device to-be-charged when the difference is equal to the difference threshold for z times in a row, where z is a positive integer greater than 1.

According to an aspect of the present disclosure, a device to-be-charged is provided, which includes: a battery; a wireless receiver circuit, configured to receive an electromagnetic signal transmitted by a wireless charging device, and convert the electromagnetic signal into an output current to charge the battery; a detection module, configured to detect an actual output voltage of the wireless receiver circuit in the device to-be-charged; and a control module, configured to determine, according to the actual output voltage, whether the device to-be-charged and the wireless charging device are misaligned with each other during a wireless charging process; and set a target output voltage of the wireless receiver circuit in the device to-be-charged as being equal to the actual output voltage, when it is determined that the device to-be-charged and the wireless charging device are misaligned with each other.

According to an implementation of the present disclosure, the control module includes: a difference determining unit, configured to determine a difference between the target output voltage and the actual output voltage; a difference feedback unit, configured to feed back the difference to the wireless charging device when the difference is greater than the difference threshold; and a misalignment determining unit, configured to determine the device to-be-charged and the wireless charging device are misaligned with each other when the difference is not equal to the difference threshold for m times in a row, where m is a positive integer greater than 1.

According to an implementation of the present disclosure, the control module is further configured to: after the target output voltage of the wireless receiver circuit in the device to-be-charged is set as being equal to the actual output voltage, determine the difference between the target output voltage and the actual output voltage, feed back the difference to the wireless charging device when the difference is greater than the difference threshold, and set the target output voltage of the wireless receiver circuit in the device to-be-charged as being equal to the actual output voltage when the difference is not equal to the difference threshold for n times in a row, where n is a positive integer greater than 1.

According to an implementation of the present disclosure, the detection module is further configured to detect an output current of the wireless receiver circuit in the device to-be-charged when the difference is equal to the difference threshold for n times in a row. The control module is further configured to: determine whether the output current satisfies a condition of entering a current-and-voltage adaptive procedure when the difference is equal to the difference threshold for n times in a row, and perform voltage-rising and current-decreasing operations in the current-and-voltage adaptive procedure when the output current satisfies the condition of entering the current-and-voltage adaptive procedure.

According to an implementation of the present disclosure, the control module is further configured to: after voltage-rising and current-decreasing operations are performed in the current-and-voltage adaptive procedure, determine the difference between the target output voltage and the actual output voltage, feed back the difference to the wireless charging device when the difference is greater than the difference threshold, and decrease a charging current applied to both ends of the battery in the device to-be-charged when the difference is not equal to the difference threshold for x times in a row, where x is a positive integer greater than 1.

According to an implementation of the present disclosure, the control module is further configured to: after a charging current applied to both ends of the battery in the device to-be-charged is decreased, determine the difference between the target output voltage and the actual output voltage, feed back the difference to the wireless charging device when the difference is greater than the difference threshold, and set the target output voltage of the wireless receiver circuit in the device to-be-charged as being equal to the actual output voltage when the difference is not equal to the difference threshold for y times in a row, where y is a positive integer greater than 1.

According to an implementation of the present disclosure, the control module is further configured to increase the charging current applied to both ends of the battery in the device to-be-charged when the difference is equal to the difference threshold for y times in a row.

According to an implementation of the present disclosure, the control module is further configured to: after the charging current applied to both ends of the battery in the device to-be-charged is decreased, determine the difference between the target output voltage and the actual output voltage, feed back the difference to the wireless charging device when the difference is greater than the difference threshold, and continue to increase the charging current applied to both ends of the battery in the device to-be-charged when the difference is equal to the difference threshold for z times in a row, where z is a positive integer greater than 1.

According to an implementation of the present disclosure, the battery includes multiple cells connected in series.

According to an aspect of the present disclosure, a wireless charging system is provided, which includes a device to-be-charged and a wireless charging device. The wireless charging device is configured to convert the input electric energy into an electromagnetic signal for transmission, to perform wireless charging on the device to-be-charged. The device to-be-charged includes: a battery; a wireless receiver circuit, configured to receive the electromagnetic signal transmitted by the wireless charging device, and convert the electromagnetic signal into an output current to charge the battery; a detection module, configured to detect an actual output voltage of the wireless receiver circuit; and a first control module, configured to: determine, according to the actual output voltage, whether a position of the device to-be-charged is offset with respect to the wireless charging device during a wireless charging process; and force a difference between a target output voltage of the wireless receiver circuit and the actual output voltage to be zero when it is determined that the position of the device to-be-charged is offset with respect to the wireless charging device.

According to an implementation of the present disclosure, the first control module includes: a difference determining unit, configured to determine the difference between the target output voltage and the actual output voltage; a difference feedback unit, configured to feed back the difference to the wireless charging device when the difference is greater than a preset difference threshold; and a misalignment determining unit, configured to determine the position of the device to-be-charged is offset with respect to the wireless charging device when the difference is not equal to the difference threshold for m times in a row, where m is a positive integer greater than 1.

According to an implementation of the present disclosure, the wireless charging system further includes: a power supply device, configured to provide the input electric energy to the wireless charging device.

According to another aspect of the present disclosure, a readable storage medium is provided, which stores executable instructions. The executable instructions, when being executed by a processor, cause the above wireless charging method to be implemented.

In the wireless charging method provided in the embodiments of the present disclosure, by detecting the actual output voltage of the wireless receiver circuit in the device to-be-charged, it is determined whether the device to-be-charged and the wireless charging device are misaligned with each other during the wireless charging process. And when it is determined that the misalignment exists, the target output voltage of the wireless receiver circuit in the device to-be-charged is set as being equal to the actual output voltage. In one aspect, it can ensure that the wireless charging device provides the maximum charging power to the device to-be-charged to ensure fast execution of the wireless charging, and since the difference CEP is stable, the subsequent foreign object detection procedure can be normally performed. In another aspect, since the difference is forced to be zero, the device to-be-charged can be prevented from continuously requesting the wireless charging device to increase the transmit power thereof and thus the communication resources can be prevented from being occupied all the time.

It should be understood that the general description above and the detailed description below are merely exemplary, which should be interpreted as limiting the present disclosure. Other characteristics and advantages of the present disclosure may become clear through the detailed description below, or be obtained partly through the practice of the present disclosure.

The exemplary embodiments are now described comprehensively with reference to the drawings. However, the exemplary embodiments can be implemented in various forms, and they should not be understood to be limiting. On the contrary, these embodiments are provided to enable the present disclosure more comprehensive and complete, and enable the concept of the exemplary embodiments to be conveyed completely to those skilled in the art. The drawings are only schematic illustrations of the present disclosure, and are not necessarily drawn to scale. The same reference numerals denote same or similar parts in the drawings, and thus the repeated description of them will be omitted.

In the present disclosure, unless being clearly defined otherwise, the terms such as "connect" and "connection" should be understood in a wide sense, for example, they may refer to an electronic connection or a communication connection; or they may refer to direct or indirect connection. For those skilled in the art, the specific meanings of the terms above in the present disclosure may be understood according to specific conditions.

In addition, the terms "first" and "second" are only for the purposes of description, and cannot be understood to indicate or imply relative importance or implicitly indicate the number of related technical features. Therefore, the features defined with "first" and "second" may explicitly and implicitly include one or more such features. In the description of the present disclosure, "multiple" means at least two, such as two or three, unless being clearly defined otherwise.

During a wireless charging process, a power supply device (for example, an adaptor) is usually connected with a wireless charging device (for example, a wireless charging dock), and the wireless charging device transmits the output power of the power supply device wirelessly to a device to-be-charged, so as to wirelessly charge the device to-be-charged.

In the light of different principles of wireless charging, there are mainly three wireless charging methods, i.e., magnetic coupling (or electromagnetic induction) type, electromagnetic resonance type and radio wave type wireless charging. And at present, the prevailing standards for wireless charging include Qi standard, Power Matters Alliance (PMA) standard, and Alliance for Wireless Power (A4WP) standard. Among them, both the Qi standard and the PMA standard direct at the magnetic coupling type wireless charging, and the A4WP standard directs at the electromagnetic resonance type wireless charging.

FIG. 1 is a systematic structural diagram of a wireless charging system according to an exemplary embodiment.

Referring to FIG. 1, a wireless charging system 1 includes a power supply device 11, a wireless charging device 12 and a device to-be-charged 13. The power supply device 11 may be, for example, a power adaptor and a Power Bank. The wireless charging device 12 may be, for example, a wireless charging dock. The device to-be-charged 13 may be, for example, a terminal device.

After the power supply device 11 is connected with the wireless charging device 12, the current output by the power supply device 11 is transmitted to the wireless charging device 12.

The wireless charging device 12 includes a wireless transmitter circuit 121 and a first control module 122.

The wireless transmitter circuit 121 is configured to convert the electric energy output by the power supply device 11 into an electromagnetic signal (or an electromagnetic wave) for transmission, so as to wirelessly charge the device to-be-charged 13. For example, the wireless transmitter circuit 121 may include a wireless transmission driver circuit and a transmitting coil (or a transmitting antenna). The wireless transmission driver circuit is configured to convert a direct current output by the power supply device 11 into a high-frequency alternating current, and convert, by means of the transmitting coil or the transmitting antenna, the high-frequency alternating current into the electromagnetic signal (or the electromagnetic wave) for transmission.

The first control module 122 may be implemented, for example, in a Micro Control Unit (MCU). The first control module 122 may be configured to wirelessly communicate with the device to-be-charged 13 during the process that the wireless charging device 12 wirelessly charges the device to-be-charged 13. Specifically, the first control module 122 may wirelessly communicate with a second control module 135 in the device to-be-charged 13.

In addition, the wireless charging device 12 may further include a charging interface 123. The wireless transmitter circuit 121 may also be configured to receive the electronic energy output by the power supply device 11 through the charging interface 123, and generate the electromagnetic signal (or the electromagnetic wave) according to the electronic energy output by the power supply device 11.

The charging interface 123 may be, for example, a USB 2.0 interface, a Micro USB interface or a USB TYPE-C interface. In some implementations, the charging interface 123 may also be a lightning interface, or a parallel interface or serial interface of any other type which can be used for charging.

The wireless charging device 12 may communicate with the power supply device 11 for example through the charging interface 123, without additionally providing a communication interface or other wireless communication modules, which simplifies the implementation of the wireless charging device 13. For example, the charging interface 123 is a USB interface, and the wireless charging device 12 (or the wireless transmitter circuit 121) can communicate with the power supply device 13 based on a data line (for example, a D+ and/or D− line) in the USB interface. For example, the charging interface 123 is a USB interface (for example, the USB TYPE-C interface) which supports the Power Delivery (PD) communication protocol, and the wireless charging device 12 (or the wireless transmitter circuit 121) can communicate with the power supply device 13 based on the PD communication protocol.

In addition, besides the charging interface 123, the wireless charging device 12 may also communicate with the power supply device 11 in other communication ways. For example, the wireless charging device 12 may communicate with the power supply device 13 wirelessly, for example, they may communicate through the Near Field Communication (NFC).

The device to-be-charged 13 may be, for example, a terminal or a communication terminal which includes, but is not limited to, a device that receives and sends communication signals via a wired line, for example, via Public Switched Telephone Network (PSTN), Digital Subscriber Line (DSL), a digital cable or direct cable connection, and/or via another data connection/network, and/or via a wireless interface, for example, a wireless interface for cellular network, Wireless Local Area Network (WLAN), digital TV network such as Digital Video Broadcasting Handheld (DVB-H) network, satellite network, or Amplitude Modulation-Frequency Modulation (AM-FM) broadcast transmitter, and/or a wireless interface of another communication terminal. The communication terminal configured to communicate via a wireless interface may be referred to as a "wireless communication terminal", a "wireless terminal" and/or a "mobile terminal". Examples of the mobile terminal include, but are not limited to, satellites or cellular phones; Personal Communication System (PCS) terminals that can combine cellular radio phones with data processing, faxing and data communication capabilities; Personal digital assistants (PDA) that can incorporate a radio phone, a pager, Internet/intranet accessing, a web browser, a memo pad, calendar and/or a Global Positioning System (GPS) receiver; and conventional laptop and/or handheld receiver or other electronic device including a radio phone transceiver. In addition, the terminal may further include, but is not limited to, such as e-book readers, smart wearable devices, portable power sources (such as a portable charger and a travel charger), electronic cigarettes, wireless mice, wireless keyboards, wireless headsets, Bluetooth speakers, and rechargeable electronic devices that has charging function.

The device to-be-charged 13 includes a wireless receiver circuit 131, a voltage conversion circuit 132, a battery 133, a first charging channel 134, a second control module 135 and a detection circuit 136.

The wireless receiver circuit 131 is configured to receive the electromagnetic signal (or the electromagnetic wave) transmitted by the wireless transmitter circuit 121, and convert the electromagnetic signal (or the electromagnetic wave) into the direct current output by the wireless receiver circuit 131. For example, the wireless receiver circuit 131 may include a receiving coil or a receiving antenna and a shaping circuit in connection with the receiving coil or the receiving antenna, such as a rectifier circuit and/or a filter circuit. The wireless receiver circuit 131 converts, by means of the receiving coil or the receiving antenna, the electromagnetic signal (or the electromagnetic wave) transmitted by the wireless transmitter circuit 121 into an alternating current, and performs, by means of the shaping circuit, operations such as rectification and/or filtering on the alternating current, thereby converting the alternating current into a stable direct current to charge the battery 131.

It should be noted that, the specific forms of the shaping circuit and the forms of the output voltage and the output current of the wireless receiver circuit 131 which is obtained after being processed by the shaping circuit are not specifically defined in the embodiments of the present disclosure.

In some implementations, the shaping circuit may include the rectifier circuit and the filter circuit. The output voltage of the wireless receiver circuit 131 may be a stable voltage obtained after the filtering operation.

In some implementations, the shaping circuit may include the rectifier circuit. The output voltage of the wireless receiver circuit 131 may be a pulsating voltage obtained after the rectifying operation. The pulsating voltage is directly applied to both ends of the battery 133 to charge the battery 133. It can be understood that, the output current of the wireless receiver circuit 131 may charge the battery 133 in an intermittent manner. The cycle of the output current of the wireless receiver circuit 131 may change with the frequency of the alternating current of the wireless charging system 1, for example, with the frequency of an alternating current grid. For example, the frequency corresponding to the cycle of the output current of the wireless receiver circuit 131 is integer or reciprocal multiples of the frequency of the grid. And when the output current of the wireless receiver circuit 131 charges the battery 133 in an intermittent manner, the waveform of the output current of the wireless receiver circuit 131 may be composed of one pulse or a group of pulses synchronized with the grid. Different from a constant direct current, the magnitude of the pulsating voltage/current changes periodically, which can reduce the lithium plating phenomenon of lithium batteries, improve the service life of the battery, and facilitate decreasing the polarization effect of the battery, increasing the charging speed and decreasing the heat generated by the battery, thereby ensuring the safety and reliability of the device to-be-charged during the charging.

When the output voltage of the wireless receiver circuit 131 cannot satisfy the charging voltage desired by the battery 133, and/or the output current of the wireless receiver circuit 131 cannot satisfy the charging current desired by the battery 133, conversion may be performed by the first voltage conversion circuit 132 on the first charging channel 134 (for example a wire), thereby obtaining the charging voltage and/or the charging current desired by the battery 133. For example, the output voltage and the output current of the wireless receiver circuit 131 are input into the first voltage conversion circuit 132 through the first charging channel 134; after the first voltage conversion circuit 132 converts the input voltage, the output voltage and current are applied to both ends of the battery 133 through the first charging channel 134, thereby satisfying the charging voltage and/or the charging current desired by the battery 133.

The battery 133 may include a single cell or multiple cells. In the case where the battery 133 includes multiple cells, the multiple cells are connected in series. Thus, the affordable charging voltage of the battery 133 is a sum of the affordable charging voltage of the multiple cells, thereby improving the charging speed and decreasing the heat generated during the charging.

For example, taking a case where the device to-be-charged 13 is a phone as an example, when the battery 133 of the device to-be-charged 13 includes a single cell, the voltage of the inner single cell is usually between 3.0V and 4.35V. But when the battery 133 of the device to-be-charged 13 includes two cells connected in series, the total voltage of the two cells connected in series is between 6.0V and 8.7V. Hence, when multiple cells are adopted, the output voltage of the wireless receiver circuit 131 can be improved compared with the case where single cell is adopted. Compared with the case where single cell is adopted, the charging current required by the multiple cells is about 1/N of the charging current required by the single cell (N is the number of the cells connected in series in the device to-be-charged 13) for achieving a same charging speed. In other words, under the premise of ensuring the same charging speed, the solution adopting the multiple cells can reduce the magnitude of the charging current, thereby decreasing the heat generated by the device to-be-charged 13 during the charging process. In another aspect, compared with the solution adopting the single cell, in the case where the charging current is kept the same, the solution adopting the multiple cells can improve the charging voltage, and thus improve the charging speed.

The second control module 135 may be implemented, for example, in an independent MCU, or an Application Processor (AP) in the device to-be-charged 13. The second control module 135 is configured to communicate with the first control module 122 in the wireless charging device 12, and feed back information, such as the detected voltage and/or current on the first charging channel 134, the remaining battery capacity of the battery 133 or the preset time for fully charging, to the wireless charging device 12; and furthermore, it may further feed back information on the error, information about stopping the transmission and the like to the first control module 122. In addition, the feedback may further include adjustment instructions of the voltage and/or the current which are determined by the device to-be-charged 13 according to information such as the detected voltage and/or current on the first charging channel 134, the remaining battery capacity or the preset time for fully charging.

The detection circuit 136 is configured to detect the voltage and/or current on the first charging channel 134. The voltage and/or current on the first charging channel 134 may be the voltage and/or current between the first voltage conversion circuit 132 and the battery 133, that is, the output voltage and/or output current of the first voltage conversion circuit 132 which is directly applied to the battery 133 for charging the battery 133. Alternatively, the voltage and/or current on the first charging channel 134 may be the voltage and/or current between the wireless receiver circuit 131 and the first voltage conversion circuit 132, that is, the output voltage and/or output current of the wireless receiver circuit 131.

In some implementations, the detection circuit 136 may include a voltage detection circuit and a current detection circuit.

The voltage detection circuit is configured to sample the voltage on the first charging channel 134, and transmit the sampled voltage to the second control module 135. The voltage detection circuit may sample the output voltage of the wireless receiver circuit 131, for example through voltage division when being connected in series therewith.

The current detection circuit is configured to sample the current on the first charging channel 134, and transmit the sampled current to the second control module 135. The current detection circuit may sample the current on the first charging channel 134 via a current sensing resistor and a galvanometer.

After the first control module 122 receives the information that is fed back by the device to-be-charged 13 via the second control module 135, the first control module can adjust a transmit power of the wireless transmitter circuit 121 according to the voltage and/or current on the first charging channel 134 or the adjustment instruction of the voltage and/or current, thereby enabling the voltage and/or current of the direct current output by the first charging channel 134 to match the charging voltage and/or current required by the battery 133.

It should be understood that, the expression "match the charging voltage and/or current required by the battery 133" mentioned above means that: the voltage and/or current of the direct current output by the first charging channel 134 is equal to the charging voltage and/or current desired by the battery 133, or it fluctuates within a preset range with respect to the charging voltage and/or current desired by the battery 133 (for example, the voltage fluctuates by 100 millivolts to 200 millivolts).

Alternatively, after the first control module 122 receives the information that is fed back by the device to-be-charged 13 via the second control module 135, the first control module can adjust the transmit power of the wireless transmitter circuit 121 according to the voltage and/or current on the first charging channel 134 or the adjustment instruction of the voltage and/or the current, thereby enabling the voltage and/or current of the direct current output by the first charging channel 134 to satisfy the charging requirement of the battery 133 in at least one of a trickle charging phase, a constant current charging phase and a constant voltage charging phase.

The charging process of the battery may include one or more of the trickle charging phase, the constant current charging phase and the constant voltage charging phase. In the trickle charging phase, the fully discharged battery is pre-charged (that is, restorative charging). The trickle charging current is usually one-tenth of the constant charging current. When the voltage of the battery rises beyond a trickle charging voltage threshold, the charging current is increased and the constant charging phase is entered.

In the constant charging phase, the battery is charged with a constant current, and the charging voltage rises fast; and when the charging voltage reaches a charging voltage threshold desired by the battery, the constant voltage charging phase is entered. In the constant voltage charging phase, the battery is charged with a constant voltage, and the charging current is decreased gradually; and when the charging current is decreased to a preset current threshold (the current threshold usually is one-tenth of the charging current adopted in the constant current charging phase or less, and optionally, the current threshold may be tens of milliamps or less), the battery is fully charged. After the battery is fully charged, a part of the current may be lost due to self-discharging of the battery, and thus a supplemental charging phase is entered. In the supplemental charging phase, the charging current is small, only for the purpose of ensuring that the battery is the fully charged state.

It should be noted that, the constant current charging phase mentioned in the embodiments of the present disclosure does not require that the charging current is completely constant and unchanged, rather, it may generally means that the peak or mean of the charging current is kept unchanged within a period of time for example. In practice, in the constant current charging phase, the charging may be performed in a Multi-stage constant current charging way.

For the Multi-stage constant current charging, there may be M constant current stages (M is an integer not smaller than 2). In the Multi-stage constant current charging, it starts with a first charging stage performed with a preset charging current, and the M constant current stages of the Multi-stage constant current charging are performed sequentially from the first charging stage to the M-th charging stage. After a previous constant current stage proceeds to its following constant current stage of the constant current stages, the current can be reduced. When the voltage of the battery reaches a charging termination voltage threshold, the previous constant current phase proceeds to its following constant current stage of the constant current stages. The change of the current between two adjacent constant current stages may be gradual, or stepped.

In addition, as mentioned above, the second control module 135 can also send battery status information to the first control module 122. The battery status information includes: the current battery level and/or the current voltage of the battery 133 in the device to-be-charged 13. After the first control module 122 receives the battery status information, the first control module may first determine the current charging phase of the battery 133 according to the battery status information, and then determine a target output voltage and/or target charging current matching the current charging phase of the battery 133. Thereafter, the first control module 122 can compare the output voltage and/or the output current of the first charging channel 134 that is sent by the second control module 135 with the determined target output voltage and/or target charging current of the current charging phase of the battery 133, to determine whether the output voltage and/or output current of the first charging channel 134 matches the determined current charging phase of the battery 133. If the output voltage and/or output current of the first charging channel 134 does not match the current charging phase of the battery 133, the transmit power of the wireless transmitter circuit 121 is adjusted until the fed back output voltage and/or output current of the first charging channel 134 matches the current charging phase of the battery 133.

In addition, as mentioned above, the second control module 135 may directly feed back the detected output voltage and/or output current of the first charging channel 134 to the first control module 121, or may also feed back the adjustment instruction determined according to the detected output voltage and/or output current of the first charging channel 134. The adjustment instruction may be, for example, an instruction for increasing or decreasing the transmit power of the wireless transmitter circuit 121. Alternatively, the wireless charging device 12 may set multiple grades for the transmit power of the wireless transmitter circuit 121. Each time the first control module 121 receives the adjustment instruction, one grade of the transmit power of the wireless transmitter circuit 121 is adjusted, until the fed back output voltage and/or output current of the first charging channel 134 matches the current charging phase of the battery 133.

In addition, as mentioned above, the second control module 135 can also send to the first control module 122: information for safety protection, anomaly detection or fault handling, for example, the temperature information of the battery 133; information indicating the entry of the over-voltage protection or over-current protection; power transmission efficiency information (which may be used to indicate the efficiency of power transmission between the wireless transmitter circuit 121 and the wireless receiver circuit 131) and the like.

The temperature information of the battery 133 may be used to control the charging circuit to enter a protection state, for example, control the charging circuit to stop the wireless charging. The information indicating the over-voltage protection or over-current protection may be used to control the wireless transmitter circuit 121 to stop working. The power transmission efficiency information may be used to control the wireless transmitter circuit 121 to stop working, and inform a user of this matter. For example, the display screen of the device to-be-charged 13 may display that the power transmission efficiency is too low, or an indicator light of the device to-be-charged 13 may indicate that the power transmission efficiency is too low, so that the user can adjust the environment of wireless charging.

In addition, the temperature information, the information indicating the peak or mean of the output voltage and/or output current of the first charging channel 134, the power transmission efficiency information may serve as other related information for adjusting the transmit power of the wireless transmitter circuit 121, thereby the transmit power of the wireless transmitter circuit 121 can be adjusted.

For example, the second control module 135 can send the temperature information of the battery 133 to the first control module 122. If the temperature of the battery 133 is too high, the first control module 122 can reduce the transmit power of the wireless transmitter circuit 121 to reduce the output current of the wireless receiver circuit 131, thereby decreasing the temperature of the battery 133.

For another example, in the case where the wireless receiver circuit 131 outputs pulsating voltage and/or current, the second control module 135 can send, to the first control module 122, information indicating the peak or mean of the output voltage and/or output current of the wireless receiver circuit 131. The first control module 122 can determine whether the peak or mean of the output voltage and/or output current of the first charging channel 134 matches the current charging phase of the battery 133. If the peak or mean of the output voltage and/or output current of the first charging channel 134 does not match the current charging phase of the battery 133, the transmit power of the wireless transmitter circuit 121 is adjusted.

For another example, the power transmission efficiency information may be used to determine the amount of adjustment of the transmit power of the wireless transmitter circuit 121. For example, when the power transmission efficiency information indicates that the efficiency of power transmission between the wireless transmitter circuit 121 and the wireless receiver circuit 131 is low, the amount of adjustment the transmit power of the wireless transmitter circuit 121 can be increased, thereby enabling the transmit power of the wireless transmitter circuit 121 to quickly reach a target power.

The communication mode and the communication sequence between the wireless charging device 12 and the device to-be-charged 13 (or between the first control module 122 and the second control module 135) are not limited in the present disclosure.

In some implementations, the wireless communication between the wireless charging device 12 and the device to-be-charged 13 (or between the first control module 122 and the second control module 135) may be one-way wireless communication. Here it is illustrated by taking a case where the device to-be-charged 13 is an initiator of the communication and the wireless charging device 14 is a receiver of the communication during the wireless charging process of the battery 133 as an example. For example, in the constant current charging phase of the battery, the device to-be-charged 13 can detect, via the detection circuit 136, the charging current of the battery 133 (that is, the output current of the first charging channel 134). When the charging current of the battery 133 does not match the present charging phase, the device to-be-charged 13 sends the feedback information or adjustment information to the wireless charging device 12, to instruct the wireless charging device 12 to adjust the transmit power of the wireless transmitter circuit 121.

In some implementations, the wireless communication between the wireless charging device 12 and the device to-be-charged 13 (or between the first control module 122 and the second control module 135) may be a two-way wireless communication. The two-way wireless communication usually requires that the receiver sends a response message to the initiator after receiving the communication request initiated by the initiator. The mechanism of the two-way communication enables the communication process to be safer. During the process of the two-way wireless communication, any one of the wireless charging device 12 and the device to-be-charged 13 may be a master device to initiate a two-way communication conversation, correspondingly, the other one may be a slave device to make a first response or first reply to the communication initiated by the master device. Further, the master device makes a second targeted response after receiving the first response or first reply, thereby completing one communication negotiation between the master device and the slave device.

As for the master device making the second targeted response after receiving the first response or first reply, it includes that: even if the master device does not receive the first response or first reply that is sent by the slave device for the communication conversation within a preset period of time, the master device makes the second targeted response to the first response or first reply of the slave device.

Alternatively, after the slave device makes the first response or first reply for the communication conversation initiated by the master device, it is not necessary for the master device to make the second targeted response to the first response or first reply of the slave device, that is, one communication negotiation between the master device and the slave device is completed without the second response.

In the above communication process of the wireless charging device 12 and the device to-be-charged 13, the second control module 135 of the device to-be-charged 13 couples the above feedback information into the receiving coil of the wireless receiver circuit 131, and sends it to the first control module 122 of the wireless charging device 12.

Alternatively, the device to-be-charged 13 may communicate with the wireless charging device 12 in at least one of Bluetooth, WIFI, mobile cellular network communication (such as 2G, 3G, 4G or 5G), wireless communication (such as IEEE 802.11, 802.15 (WPANs), 802.16 (WiMAX), 802.20 etc.), short-range wireless communication based on high-frequency antenna (such as 60 GHz), optical communication (such as infrared communication), ultrasonic communication, ultra-wideband (UMB) communication and the like, thereby sending the above feedback information to the wireless charging device 12. It can be understood that, when the communication is performed in the above-mentioned ways, the device to-be-charged 13 and the wireless charging device 12 further include a corresponding communication module, such as at least one of a Bluetooth communication module, a Wi-Fi communication module, a 2G/3G/4G/5G mobile communication module, a high-frequency antenna, an optical communication module, an ultrasonic communication module, and an ultra-wideband communication module and the like. It should be understood that standards adoptable for the wireless communication mentioned above include the past and existing standards, and further include future versions and future standards that adopt these standards without departing from the scope of this disclosure. By adopting the above wireless communication, the reliability of communication can be improved, thereby improving the safety of charging. Compared with the method in the related technology (for example, Qi standard) that the feedback information is coupled, by means of signal modulation, into the receiving coil of the wireless receiver circuit 131 for communication, the reliability of communication can be improved, and the voltage ripple caused by signal coupling communication can be avoided which would otherwise affect the voltage processing of the first voltage conversion circuit 132 of the device to-be-charged 13. In addition, for the voltage ripple output by the wireless receiving coil, if such ripple is not effectively processed, safety problems may be caused in the wireless charging, bringing certain safety risks. By adopting the above mentioned wireless communication, the voltage ripple can be eliminated, thereby omitting the circuit for processing the voltage ripple, decreasing the complexity of the charging circuit of the device to-be-charged 13, improving the charging efficiency, saving the space occupied by the circuit, and decreasing the cost.

The power supply device 11 may be a power supply device with a fixed output power, or a power supply device with an adjustable output power. The power supply device with an adjustable output power may provide therein a voltage feedback loop and a current feedback loop, so that its output voltage and/or output current can be adjusted according to actual requirements.

As mentioned above, the wireless charging device 12 can continuously adjust the transmit power of the wireless transmitter circuit 121 during the charging process, so that the output voltage and/or output current of the first charging channel 134 matches the current charging phase of the battery 133.

In some implementations, the first control module 122 may adjust the amount of power drawn by the wireless transmitter circuit 121 from the maximum output power provided by the power supply device 11, thereby adjusting the transmit power of the wireless transmitter circuit 121. In other words, the control over the adjustment of the transmit power of the wireless transmitter circuit 121 is allocated to the first control module 122. After receiving the feedback information of the device to-be-charged 13, the first control module 122 can adjust the transmit power of the wireless transmitter circuit 121 by adjusting the amount of power extracted from the maximum output power, which has the advantages of fast adjustment speed and high efficiency.

For example, a power adjustment circuit may be provided inside the first control module 122, inside the wireless transmitter circuit 121, or between the first control module 122 and the wireless transmitter circuit 121. The power adjustment circuit may include, for example, a Pulse Width Modulation (PWM) controller and a switch unit. The first control module 122 can adjust the transmit power of the wireless transmitter circuit 121 by adjusting the duty cycle of the control signal sent by the PWM controller, and/or by controlling the switching frequency of the switch unit.

Alternatively, in other implementations, the first control module 122 may adjust the output voltage and/or output current of the power supply device 11 by communicating with the power supply device 11, thereby adjusting the transmit power of the wireless transmitter circuit 121. That is, the control over the adjustment of the transmit power of the wireless transmitter circuit 121 is allocated to the power supply device 11, and the power supply device 11 adjusts the transmit power of the wireless transmitter circuit 121 by changing the output voltage and/or output current. The advantage of this adjustment method lies in that no power is wasted since the power supply device 11 can provide the exact amount of power required by the wireless charging device 12.

It should be understood that, similar to the communication between the wireless charging device 12 and the device to-be-charged 13, the communication between the wireless charging device 12 (or the first control module 122) and the power supply device 11 may be the one-way communication or two-way communication, which is not specifically limited in the embodiments of the present disclosure.

Figure 2:
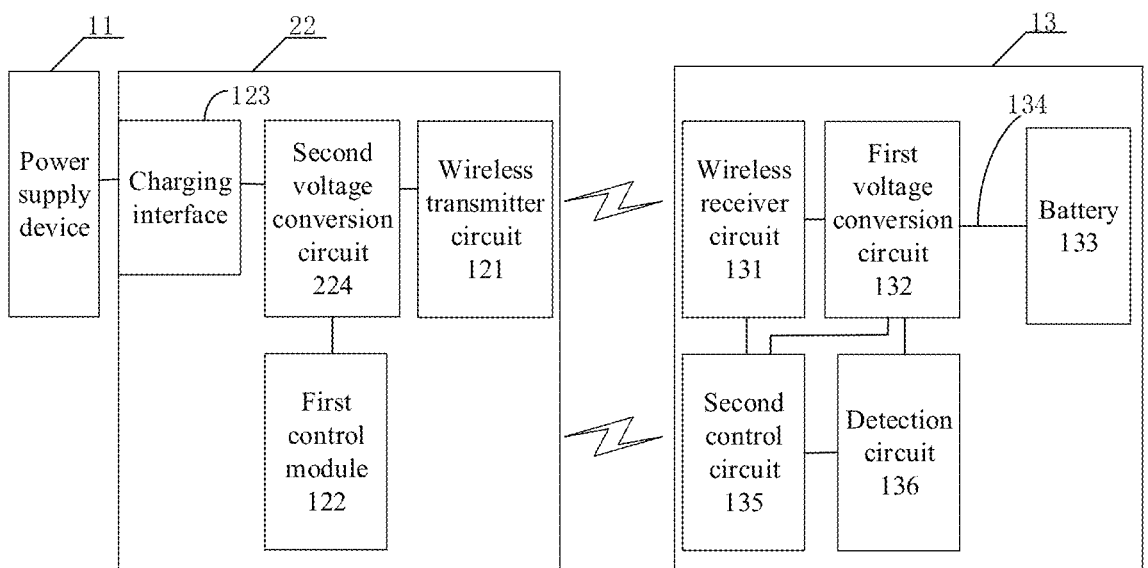
FIG. 2 is a schematic structural diagram of another wireless charging system illustrated according to an exemplary embodiment.

FIG. 2 is a schematic structural diagram of another wireless charging system illustrated according to an exemplary embodiment.

Referring to FIG. 2, the difference from the wireless charging system 1 illustrated in FIG. 1 is that the wireless charging device 22 in the wireless charging system 2 further includes a second voltage conversion circuit 224. The second voltage conversion circuit 224 is arranged between the charging interface 123 and the wireless transmitter circuit 121, and can be configured to receive an output voltage and output current of the power supply device 11. The wireless transmitter circuit 121 is configured to generate an electromagnetic signal (or an electromagnetic wave) based on the voltage and current converted by the second voltage conversion circuit 224.

The first control module 122 adjusting the transmit power of the wireless transmitter circuit 121 may include: the first control module 122 adjusts the voltage and/or current converted by the second voltage conversion circuit 224, thereby adjusting the transmit power of the wireless transmitter circuit 121.

In the case where the power supply device 11 is a power supply device with a fixed output power, the first control module can adjust the output voltage and/or output current of the second voltage conversion circuit 224, thereby adjusting the transmit power of the wireless transmitter circuit 121. In this way, the versatility of the wireless charging device 22 can be improved, and it can be applied to the existing common power supply device 11. The second voltage conversion circuit 224 may include, for example, a PWM controller and a switch unit. The first control module may adjust the output voltage and/or output current of the second voltage conversion circuit 224 by adjusting the duty cycle of the control signal sent by the PWM controller, and/or by controlling the switching frequency of the switch unit, thereby adjusting the transmit power of the wireless transmitter circuit 121.

Optionally, in some implementations, the second voltage conversion circuit 224 may receive the output voltage and output current of the power supply device 11 through the charging interface 123. For example, in the case where the power supply device 11 is a common power supply device, the wireless charging device 22 is connected with the common power supply device through the charging interface 123. In the process of wireless charging, the first control module 122 can control the second voltage conversion circuit 224 to start working, and adjust the output voltage and/or output current of the second voltage conversion circuit 224 according to the feedback information of the device to-be-charged 13, so that the transmit power of the wireless transmitter circuit 121 satisfies the current charging requirements of the battery 133. This adjustment method also allocates the control over the adjustment of the transmit power of the wireless transmitter circuit 121 to the first control module 122. Upon receiving the feedback information of the device to-be-charged 13, the first control module 122 can immediately adjust the transmit power of the wireless transmitter circuit 121, which has the advantages of fast adjustment speed and high efficiency.

It should also be understood that, the output current of the power supply device 11 may be a constant direct current, a pulsating direct current or alternating current, which is not specifically limited in the present disclosure.

The above description is illustrated by taking the case where the wireless charging device 12 or 22 is connected with the power supply device 11 and obtains electric energy from the power supply device 11 as an example, but the present disclosure is not limited thereto. The wireless charging device 12 or 22 can also incorporate a function similar to that of an adapter, so as to directly convert the externally input alternating current power (such as commercial power) into the above-mentioned electromagnetic signal (or electromagnetic wave). For example, the function similar to that of an adapter can be incorporated in the wireless transmitter circuit 121 of the wireless charging device 12 or 22, for example, a rectifier circuit, a primary filter circuit, and/or a transformer can be integrated in the wireless transmitter circuit 121. In this way, the wireless transmitter circuit 121 can be configured to receive the externally input alternating current (such as 220V alternating current, which is also called commercial power), and generate the electromagnetic signal (or the electromagnetic wave) according to the alternating current. Incorporating the function similar to that of an adapter into the wireless charging device 12 or 22 enables the wireless charging device 12 or 22 not necessarily to obtain power from an external power supply device, thereby improving the integration of the wireless charging device 12 or 22 and decreasing the number of devices required for performing the wireless charging process.

In addition, the wireless charging device 12 or 22 may support a first wireless charging mode and a second wireless charging mode. The changing speed that the wireless charging device 12 or 22 charges the device to-be-charged 13 in the first wireless charging mode is faster than the charging speed that the wireless charging device 12 or 22 charges the device to-be-charged 13 in the second wireless charging mode. In other words, compared with the wireless charging device 12 or 22 working in the second wireless charging mode, the wireless charging device 12 or 22 working in the first wireless charging mode takes a shorter time to make the battery of the device to-be-charged 13 with the same capacity fully charged.

The first wireless charging mode may be a fast wireless charging mode. The second wireless charging mode may be referred to as a normal wireless charging mode, for example, it may be a conventional wireless charging mode based on the QI standard, the PMA standard, or the A4WP standard. A normal wireless charging mode may be a wireless charging mode in which the transmit power of the wireless charging device 12 or 22 is relatively small (usually less than 15 W, and the commonly used transmit power is 5 W or 10 W).

In the normal wireless charging mode, it usually takes several hours to make a large-capacity battery (such as a battery of 3000 mAh) fully charged. In contrast, in the fast wireless charging mode, the transmit power of the wireless charging device 12 or 22 is relatively large (usually greater than or equal to 15 W). Compared with the normal wireless charging mode, the wireless charging device 12 or 22 working in the fast wireless charging mode takes a much shorter time to make a battery with the same capacity fully charged, and the charging speed thereof is faster.

In some implementations, the first control module 122 and the second control module 135 perform a two-way communication to control the transmit power of the wireless transmitter circuit 121 in the first wireless charging mode.

In some implementations, as for the first control module 122 and the second control module 135 performing the two-way communication to control the transmit power of the wireless transmitter circuit 121 in the first wireless charging mode, it may include: the first control module 122 and the second control module 135 perform the two-way communication to negotiate the wireless charging mode between the wireless charging device 12 or 22 and the device to-be-charged 13.

For example, the first control module 122 performs handshake communication with the second control module 135. When the handshake communication succeeds, the wireless charging device 12 or 22 is controlled to use the first wireless charging mode to charge the device to-be-charged 13. When the handshake communication fails, the wireless charging device 12 or 22 is controlled to use the second wireless charging mode to charge the device to-be-charged 13.

In the handshake communication, the two communicating parties may identify each other's identities. The success of the handshake communication may indicate that the wireless charging device 12 or 22 and the device to-be-charged 13 both support wireless charging with an adjustable transmit power. The failure of the handshake communication may indicate that at least one of the wireless charging device 12 or 22 and the device to-be-charged 13 do not support wireless charging with the adjustable transmit power.

In the present disclosure, the wireless charging device 12 or 22 does not blindly adopt the first wireless charging mode to perform fast wireless charging on the device to-be-charged 13. Rather, the wireless charging device performs the two-way communication with the device to-be-charged 13 to negotiate whether the wireless charging device 12 or 22 can adopt the first wireless charging mode to perform fast wireless charging on the device to-be-charged 13, which can improve the safety of the charging process.

In some implementations, performing the two-way communication between the first control module 122 and the second control module 135 to negotiate the wireless charging mode between the wireless charging device 12 or 22 and the device to-be-charged 13 may include: for example, the first control module 122 sends, to the second control module 135, a first instruction to inquire whether the device to-be-charged 13 enables the first wireless charging mode; the first control module 122 receives a reply instruction for the first instruction that is sent by the second control module 135, the reply instruction indicating whether the device to-be-charged 13 agrees to enable the first wireless charging mode; in the case where the device to-be-charged 13 agrees to enable the first wireless charging mode, the first control module controls the wireless charging device 12 or 22 to use the first wireless charging mode to charge the device to-be-charged 13.

Besides determining the wireless charging mode based on communication negotiation, the first control module 122 may also select or switch the wireless charging mode according to some other factors. For example, the first control module 122 can also control, according to the temperature of the battery 133, the wireless charging device 12 or 22 to use the first wireless charging mode or the second wireless charging mode to charge the battery 133. For example, when the temperature is lower than a preset low temperature threshold (such as 5° C. or 10° C.), the first control module 122 can control the wireless charging device 12 or 22 to use the second wireless charging mode to perform the normal charging. When the temperature is greater than or equal to the low temperature threshold, the first control module 122 may control the wireless charging device 12 or 22 to use the first wireless charging mode to perform the fast charging. Further, when the temperature is higher than a high temperature threshold (such as 50° C.), the first control module 122 can control the wireless charging device 12 or 22 to stop charging.

It should be noted that the block diagrams shown in the above drawings are functional entities, and do not necessarily correspond to physically or logically independent entities. These functional entities may be implemented in software, or implemented in one or more hardware modules or integrated circuits, or implemented in different networks and/or processor devices and/or microcontroller devices.

During the wireless charging process, if a metal foreign object (such as a coin, a key chain, or a key) is placed between the coils, eddy current is generated, which causes the metal foreign object to generate heat, bringing danger to the charging process. The foreign object detection function in the wireless charging technologies is used to detect whether a foreign object exists during the process of performing wireless charging between the device to-be-charged and the wireless charging device. If the foreign object exists, it is required to stop charging and make a related instruction. For example, the wireless charging device can indicate abnormality of the charging by making a light thereon flash, and at the same time, notify the device to-be-charged to interrupt the wireless charging. And the device to-be-charged can also display the abnormality of the charging on the screen after receiving the indication to interrupt the wireless charging.

The wireless charging device can detect whether the foreign object exists by comparing the transmit power and the received power. If the received power is much smaller than the transmit power, for example when the difference between the transmit power and the received power is greater than the difference threshold (for example 600 mW), it is determined that the foreign object exists.

When the device to-be-charged and the wireless charging device (such as the wireless charging dock) are misaligned with each other, since the energy provided by the wireless charging device to the device to-be-charged is insufficient, the device to-be-charged occupies the communication channel all the time to request the wireless charging dock to increase its transmit power. This situation not only causes a waste of communication channel resources, but also affects the normal operation of the foreign object detection procedure.

At present, for the solution adopting variable frequency wireless charging, the resonant frequency may be detected to determine whether the device to-be-charged and the wireless charging device are misaligned with each other. When the device to-be-charged and the wireless charging device are misaligned with each other, in the solution adopting variable frequency wireless charging, the transmit power of the wireless charging device is adjusted by adjusting the resonance frequency. Therefore, by detecting the change of the resonance frequency, it can be determined whether the device to-be-charged and the wireless charging device are misaligned with each other. But for the solution adopting fixed-frequency wireless charging, it is obvious that this detection method cannot be applied.

In order to solve the above problems, the embodiments of the disclosure provide a method which determines whether the device to-be-charged and the wireless charging device are misaligned with each other by detecting the charging voltage received by the device to-be-charged, and ensures the normal operation of the foreign object detection procedure by limiting the power.

FIG. 3 is a flowchart of a wireless charging method illustrated according to an exemplary embodiment. The wireless charging method 10 shown in FIG. 3 may be applied to the wireless charging system 1 or 2 shown in FIG. 1 or FIG. 2, and more specifically, may be applied to the device to-be-charged 13 in the wireless charging system 1 or 2 described above.

Referring to FIG. 3, the wireless charging method 10 includes operations as follows.

In operation S102, it is determined whether the device to-be-charged and the wireless charging device are misaligned with each other during the wireless charging process, according to a detected actual output voltage of the wireless receiver circuit in the device to-be-charged.

Taking the wireless charging system 1 or 2 shown in FIG. 1 or FIG. 2 as an example, if the device to-be-charged 13 and the wireless charging device 12 or 22 are misaligned with each other, that is, when the position of the device to-be-charged 13 on the wireless charging device 12 or 22 is offset, the efficiency of wireless charging becomes low. However, since the load of the device to-be-charged 13 is fixed, the wireless charging device 12 or 22 needs to provide more energy in order to provide the fixed load to the device to-be-charged 13. And when the offset between the device to-be-charged 13 and the wireless charging device 12 or 22 is large, as mentioned above, since the output power of the wireless charging device 12 or 22 has an upper limit, the device to-be-charged 13 may still fail to reach the desired charging voltage and/or current even if the upper limit is reached; accordingly, the device to-be-charged continuously requests the wireless charging device 12 or 22 to provide more power.

For example, when the device to-be-charged 13 is placed on the wireless charging device 12 or 22 for being wirelessly charged, after the above-mentioned trickle charging phase, the voltage is increased and the constant current charging phase is entered to reach the maximum charging current. The device to-be-charged 13 detects (for example, via the detection circuit 136) the actual output voltage Vact of its wireless receiver circuit 131. When the actual output voltage Vact is lower than the target output voltage Vtarget corresponding to the current charging phase, the device to-be-charged 13 feeds back the difference (which can be referred to as CEP) between the target output voltage Vtarget and the actual output voltage Vact to the first control module 122 of the wireless charging device 12 or 22 via the second control module 135. When the first control module 122 receives the difference CEP, the wireless transmitter circuit 121 is requested to increase its output voltage. But when the device to-be-charged 13 and the wireless charging device 12 or 22 are misaligned with each other, the device to-be-charged 13 continuously requests the wireless charging device 12 or 22 to increase its transmit power; and when the transmit power of the wireless transmitter circuit 121 reaches its upper limit power and the output voltage of the wireless transmitter circuit cannot be increased anymore, the actual output voltage of the wireless receiver circuit in the device to-be-charged 13 can be detected to determine whether the device to-be-charged 13 and the wireless charging device 12 or 22 are misaligned with each other during the wireless charging process.

In some implementations, the actual output voltage Vact is detected, it is determined whether the difference CEP between the target output voltage Vtarget and the actual output voltage Vact is continuously equal to the difference threshold, thereby determining whether the device to-be-charged 13 and the wireless charging device 12 or 22 are misaligned with each other during the wireless charging process. Preferably, the difference threshold is zero. In practical applications, the difference threshold can be set according to actual requirements, which is not limited in the present disclosure. Specifically, the actual output voltage Vact may be detected, and the difference CEP between the target output voltage Vtarget and the actual output voltage Vact may be compared with the difference threshold. When the difference CEP is greater than the difference threshold, the difference CEP is fed back to the wireless charging device 12 or 22 to request the wireless charging device 12 or 22 to increase the output power of the wireless transmitter circuit 121 thereof. When the difference CEP is not equal to the difference threshold for m times in a row, it is determined that the device to-be-charged 13 and the wireless charging device 12 or 22 are misaligned with each other during the wireless charging process, where m is a preset first threshold for the number of times, and is a positive integer greater than 1, preferably m=10, which is not limited in the present disclosure. In practical applications, m can be set according to actual requirements.

In operation S104, a target output voltage of the wireless receiver circuit in the device to-be-charged is set as being equal to the actual output voltage of the wireless receiver circuit, in response to determining that the device to-be-charged and the wireless charging device are misaligned with each other during the wireless charging process.

Referring to FIG. 1 or FIG. 2, when it is determined that the device to-be-charged 13 and the wireless charging device 12 or 22 are misaligned with each other during the wireless charging process, the target output voltage Vtarget of the current charging phase of the wireless receiver circuit 131 in the device to-be-charged 13 can be set as being equal to its detected actual output voltage Vact, that is, let Vtarget=Vact, to force the difference CEP therebetween to be zero. In this way, the wireless charging device 12 or 22 (or the first control module 122) do not adjust, due to the feedback difference CEP being greater than the difference threshold, the transmit power of the wireless transmitter circuit 121. This makes it possible to avoid the situation that the request for increasing the transmit power is still frequently received even the transmit power of the wireless transmitter circuit 121 has been adjusted to the upper limit. In addition, the wireless charging device 12 or 22 do not reduce the charging power provided to the device to-be-charged 13, and the maximum transmit power of the wireless transmitter circuit 121 ensures that the wireless charging is performed fast. In addition, since the CEP is forced to be zero and is in a stable state, the subsequent foreign object detection procedure can be normally performed.

In the wireless charging method provided by the embodiments of the present disclosure, the actual output voltage of the wireless receiver circuit in the device to-be-charged is detected to determine whether the device to-be-charged and the wireless charging device are misaligned with each other during the wireless charging process. When the misalignment is detected, the target output voltage of the wireless receiver circuit in the device to-be-charged is set as being equal to the actual output voltage. In one aspect, it can ensure that the wireless charging device provides the maximum charging power to the device to-be-charged to ensure fast execution of the wireless charging, and since the difference CEP is stable, the subsequent foreign object detection procedure can be normally performed. In another aspect, since the difference is forced to be zero, the device to-be-charged can be prevented from continuously requesting the wireless charging device to increase the transmit power thereof and thus the communication resources can be prevented from being occupied all the time.

It should be clearly understood that how to form and use specific examples is described in the present disclosure, but the principles of the present disclosure are not limited to any details of these examples. On the contrary, based on the teaching of the contents disclosed in the present disclosure, these principles can be applied to many other embodiments.

Figure 4:
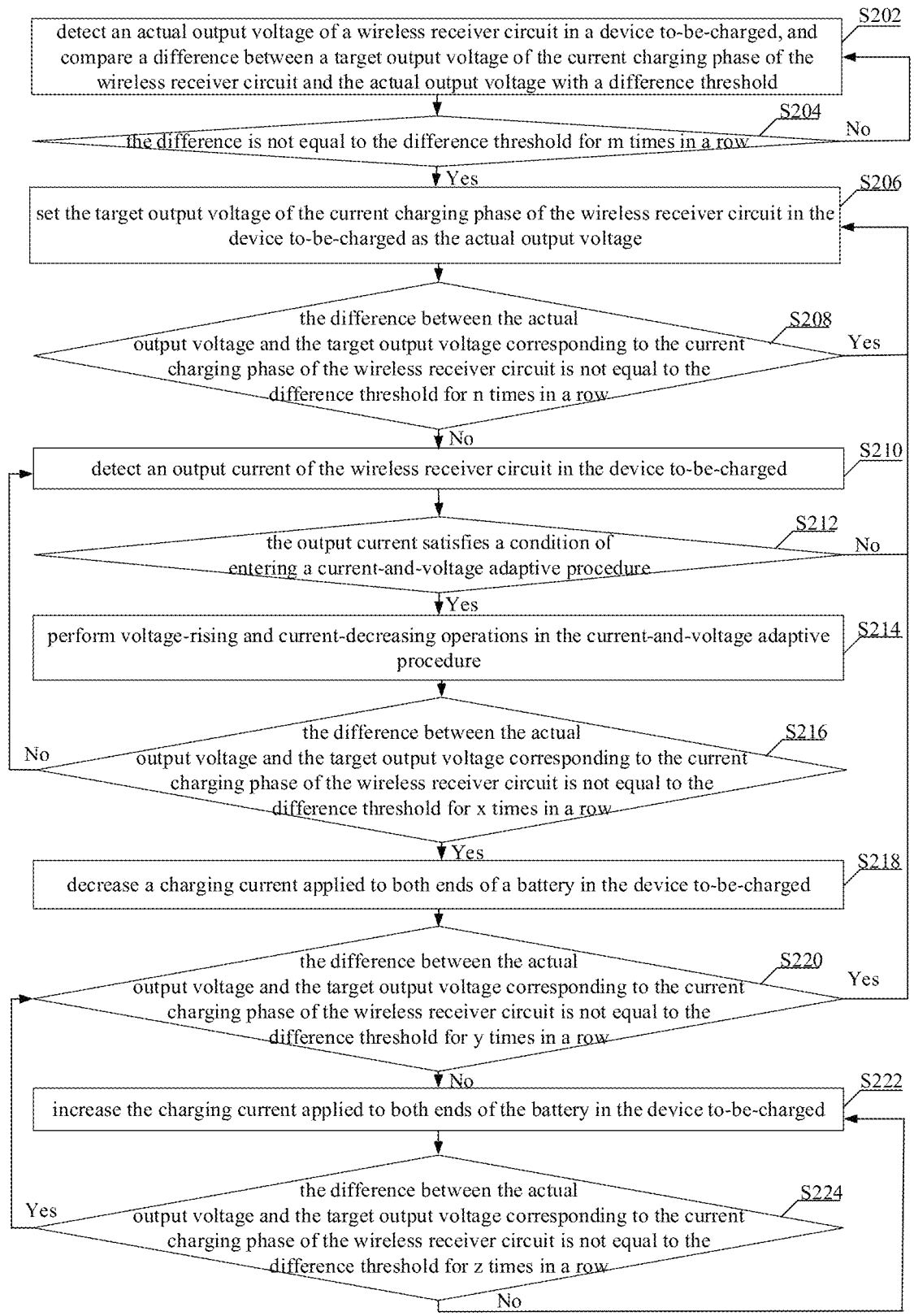
FIG. 4 is a flowchart of another wireless charging method illustrated according to an exemplary embodiment.

FIG. 4 is a flowchart of another wireless charging method illustrated according to an exemplary embodiment. Similarly, the wireless charging method 20 shown in FIG. 4 may be applied to the wireless charging system 1 or 2 shown in FIG. 1 or FIG. 2, and more specifically, it may be applied to the device to-be-charged 13 in the wireless charging system 1 or 2.

Referring to FIG. 4, the wireless charging method 20 includes operations as follows.

In operation S202, an actual output voltage of a wireless receiver circuit in the device to-be-charged is detected, and the difference between a target output voltage of the current charging phase of the wireless receiver circuit and the actual output voltage is compared with a difference threshold.

Still taking the wireless charging system 1 or 2 in FIG. 1 or FIG. 2 as an example, when the device to-be-charged 13 is placed on the wireless charging device 12 or 22 for being wirelessly charged, after the above-mentioned trickle charging phase, the voltage is increased and the constant current charging phase is entered to reach the maximum charging current. The device to-be-charged 13 detects (for example, via the detection circuit 136) the actual output voltage Vact of its wireless receiver circuit 131. When the actual output voltage Vact is lower than the target output voltage Vtarget corresponding to the current charging phase of the wireless receiver circuit 131, the device to-be-charged 13 feeds back the difference CEP between the target output voltage Vtarget and the actual output voltage Vact to the first control module 122 of the wireless charging device 12 or 22 via the second control module 135. When the first control module 122 receives the difference CEP, the wireless transmitter circuit 121 is requested to increase its output voltage.

In operation S204, it is determined whether the difference is not equal to the preset difference threshold for m times in a row. And if yes, the method proceeds to operation S206; otherwise, it returns to operation S202.

In which, m is a preset first threshold for the number of times, and is a positive integer greater than 1; preferably, m=10, but the present disclosure is not limited thereto. In practical applications, m can be set according to actual requirements. The difference threshold can preferably be set as 0, which is not limited in the present disclosure.

If the device to-be-charged 13 and the wireless charging device 12 or 22 are misaligned with each other, the device to-be-charged 13 continuously requests the wireless charging device 12 or 22 to increase its transmit power. When the transmit power of the wireless transmitter circuit 121 reaches its upper limit power and its output voltage cannot be increased anymore, the actual output voltage Vact of the wireless receiver circuit 131 in the device to-be-charged 13 can be detected, and the difference CEP between the target output voltage Vtarget of the current charging phase and the actual output voltage Vact can be compared with the difference threshold, thereby determining whether the device to-be-charged 13 and the wireless charging device 12 or 22 are misaligned with each other during the wireless charging process.

When the difference is not equal to the difference threshold for m times in a row, it can be determined that the device to-be-charged 13 and the wireless charging device 12 or 22 are misaligned with each other, and then the method proceeds to operation S206; otherwise, it returns to operation S202 to continue to detect the difference CEP.

In operation S206, the target output voltage of the current charging phase of the wireless receiver circuit in the device to-be-charged is set as being equal to the actual output voltage.

Continuing to refer to FIG. 1 or FIG. 2, when it is determined that the device to-be-charged 13 and the wireless charging device 12 or 22 are misaligned with each other during the wireless charging process, the target output voltage Vtarget of the current charging phase of the wireless receiver circuit 131 in the device to-be-charged 13 can be set as being equal to its detected actual output voltage Vact, that is, let Vtarget=Vact, to force the difference CEP therebetween to be zero. In this way, the wireless charging device 12 or 22 (or the first control module 122) does not adjust the transmit power of the wireless transmitter circuit 121, and thus the charging power provided for the device to-be-charged 13 does not be decreased; in addition, the normal operation of the foreign object detection procedure does not be affected, and it can be performed smoothly.

In operation S208, it is determined whether the difference between the actual output voltage and the target output voltage corresponding to the current charging phase of the wireless receiver circuit in the device to-be-charged is not equal to the difference threshold for n times in a row, and if yes, the method returns to operation S206; otherwise, it proceeds to operation S210.

As the power of the battery 133 in the device to-be-charged increases, the target output voltage Vtarget corresponding to the current charging phase of the wireless receiver circuit 131 may change slightly. Therefore, in the subsequent wireless charging, it is needed to continue to detect the actual output voltage Vact of the wireless receiver circuit 131 in the device to-be-charged 13, and compare the difference CEP between the target output voltage Vtarget corresponding to the current charging phase and the actual output voltage Vact with the difference threshold, to determine whether the difference CEP is not equal to the difference threshold successively, for example, to determine whether the difference CEP is not equal to the difference threshold for n times in a row.

In which, n is a preset second threshold for the number of times, and is a positive integer greater than 1; preferably, n=3, but it is not limited in the present disclosure. In practical applications, n can be set according to actual requirements.

When the difference CEP is not equal to the difference threshold for n times in a row, the method returns to operation S206, and the target output voltage Vtarget corresponding to the current charging phase of the wireless receiver circuit 131 in the device to-be-charged 13 is set as being equal to its actual output voltage Vact; otherwise, the method proceeds to operation S210.

In operation S210, an output current of the wireless receiver circuit in the device to-be-charged is detected.

During the wireless charging process, the output current Irect of the wireless receiver circuit 131 in the device to-be-charged 13 is continuously detected.

In operation S212, it is determined whether the output current satisfies a condition of entering the current-and-voltage adaptive procedure, and if yes, the method proceeds to operation S214; otherwise, it returns to operation S206.

As the power of the battery 133 in the device to-be-charged 13 increases, the charging power required by the wireless receiver circuit 131 in the device to-be-charged 13 becomes larger and larger. However, the transmit power of the wireless transmitter circuit 121 in the wireless charging device 12 or 22 has reached the upper limit and cannot be increased anymore. Therefore, the output current Irect of the wireless receiver circuit 131 in the device to-be-charged 13 is increased. In the case where the output current Irect continues to increase, it may trigger the entry of the current-and-voltage adaptive procedure.

In some implementations, the above condition of entering the current-and-voltage adaptive procedure include: when the output current Irect of the wireless receiver circuit 131 is greater than a first output current threshold and less than a second output current threshold, the output current satisfies the condition of entering the current-and-voltage adaptive procedure. The first output current threshold may be, for example, 850 mA, and the second output current threshold may be, for example, 1050 mA, which are not limited in the present disclosure.

In operation S214, voltage-rising and current-decreasing operations are performed in the current-and-voltage adaptive procedure.

In the current-and-voltage adaptive procedure, the second control module 135 in the device to-be-charged 13 requests the wireless charging device 12 or 22 to increase the output voltage of its wireless transmitter circuit 121, to increase the output voltage of the wireless receiver circuit 131 in the device to-be-charged 13. At the same time, the first voltage conversion circuit 132 decreases the current obtained from the wireless receiver circuit 131 when charging the battery 133, thereby decreasing the charging current applied to both ends of the battery 133.

In operation S216, it is determined whether the difference between the actual output voltage and the target output voltage corresponding to the current charging phase of the wireless receiver circuit in the device to-be-charged is not equal to the difference threshold for x times in a row, and if yes, the method proceeds to operation S218; otherwise, it returns to operation S210.

Since the transmit power of the wireless transmitter circuit 121 in the wireless charging device 12 or 22 has reached the upper limit and its output voltage cannot be increased anymore, at this time, the actual output voltage Vact of the wireless receiver circuit 131 in the device to-be-charged 13 is detected again, and it is determined whether the difference CEP between the target output voltage Vtarget corresponding to the current charging phase and the actual output voltage Vact is not equal to the difference threshold for x times in a row. If the difference is not equal to the difference threshold for x times in a row, the method proceeds to operation S218; otherwise, it returns to operation S210, and continues to detect the output current of the wireless receiver circuit 131 in the device to-be-charged 13.

In which, x is a preset third threshold for the number of times, and is a positive integer greater than 1; preferably, x=10, but it is not limited in the present disclosure. In practical applications, x can be set according to actual requirements.

In operation S218, the charging current applied to both ends of the battery in the device to-be-charged is decreased.

Decreasing the charging current applied to both ends of the battery 133 in the device to-be-charged 13 means that the output current of the voltage conversion circuit 132 is decreased. For example, 100 mA is decreased on the basis of ensuring a minimum charging current (such as 500 mA), but it is not limited in the present disclosure.

In operation S220, it is determined whether the difference between the actual output voltage and the target output voltage corresponding to the current charging phase of the wireless receiver circuit in the device to-be-charged is not equal to the difference threshold for y times in a row, and if yes, the method returns to operation S206; otherwise, it proceeds to operation S222.

After the charging current applied to both ends of the battery 133 in the device to-be-charged 13 is decreased, the actual output voltage Vact of the wireless receiver circuit 131 in the charging device 13 continues to be detected, and it is determined whether the difference CEP between the target output voltage Vtarget corresponding to the current charging phase and the actual output voltage Vact is not equal to the difference threshold for y times in a row. If the difference is not equal to the difference threshold for y times in a row, the method returns to operation S206, and the target output voltage corresponding to the current charging phase of the wireless receiver circuit 131 of the device to-be-charged 13 is reset as being equal to its actual output voltage; otherwise, the method proceeds to operation S222.

In which, y is a preset fourth threshold for the number of times, and is a positive integer greater than 1; preferably, y=10, but it is not limited in the present disclosure. In practical applications, y can be set according to actual requirements.

In operation S222, the charging current applied to both ends of the battery in the device to-be-charged is increased.

The determination in operation S220 is mainly used to inquire whether the device to-be-charged 13 and the wireless charging device 12 or 22 are still misaligned with each other, or the misalignment is corrected by the user, that is, there is no misalignment. If the difference CEP is equal to the difference threshold for y times in a row, it means that the device to-be-charged 13 and the wireless charging device 12 or 22 are aligned with each other. Therefore, the charging current applied to both ends of the battery 133 in the device to-be-charged 13 can be increased, to increase the charging current, which is previously decreased, back to the maximum current.

How to increase the charging current is not limited in the present disclosure, for example, it can try to increase the charging current by 50 mA every 20s, which is not limited in the present disclosure.

In operation S224, it is determined whether the difference between the actual output voltage and the target output voltage corresponding to the current charging phase of the wireless receiver circuit in the device to-be-charged is not equal to the difference threshold for z times in a row, and if yes, the current state is kept, and the method returns to operation S220; otherwise, it returns to operation S222.

After the charging current is increased once, the actual output voltage Vact of the wireless receiver circuit 131 in the device to-be-charged 13 is detected again. It is determined whether the difference between the target output voltage Vtarget corresponding to the current charging phase and the actual output voltage Vact is not equal to the difference threshold for z times in a row. If the difference is equal to the difference threshold for z times in a row, the method returns to operation S222 and continues to try to increase the charging current until the maximum charging current is reached. If the difference is not equal to the difference threshold for z times in a row, the current state is kept, and the method returns to operation S220.

In which, z is a preset fifth threshold for the number of times, and is a positive integer greater than 1; preferably, z=3, but it is not limited in the present disclosure. In practical applications, z can be set according to actual requirements.

According to the wireless charging method provided by the embodiments of the present disclosure, the actual output voltage of the wireless receiver circuit in the device to-be-charged is detected to determine whether the device to-be-charged and the wireless charging device are misaligned with each other during the wireless charging process. When the misalignment is detected, the target output voltage of the wireless receiver circuit in the device to-be-charged is set as being equal to the actual output voltage. Thereafter, as the power of the battery increases, it can be detected whether the output current of the wireless receiver circuit triggers the entry of the current-and-voltage adaptive procedure, and the charging current of the battery is accordingly decreased. In addition, by further inquiring whether the misalignment between the device to-be-charged and the wireless charging device is corrected, the charging current can be gradually increased when it is determined that the misalignment is corrected, to ensure the normal charging procedure.

It should be noted that the above-mentioned drawings are merely schematic illustrations of the processing included in the methods according to the exemplary embodiments of the present disclosure, which are not intended for limiting. It is easy to understand that the processing shown in the above drawings does not indicate or limit the time sequence of the processing. In addition, it is easy to understand that the processing can be executed for example synchronously or asynchronously in multiple modules.

The device embodiments of the present disclosure are further described below, which can be used to implement the method embodiments of the present disclosure. Those details that are not disclosed in the device embodiments of the present disclosure can be referred to the method embodiments of the present disclosure.

For the wireless charging system 1 or 2 shown in above FIG. 1 or FIG. 2, the detection module 136 in the device to-be-charged 13 is configured to detect the actual output voltage of the wireless receiver circuit 131 in the device to-be-charged 13. The second control module 135 is configured to: determine, according to the actual output voltage, whether the device to-be-charged 13 and the wireless charging device 12 or 22 are misaligned with each other during the wireless charging process; and set the target output voltage of the wireless receiver circuit 131 in the device to-be-charged 13 as being equal to the actual output voltage, when the device to-be-charged 13 and the wireless charging device 12 or 22 are misaligned with each other.

Figure 5:
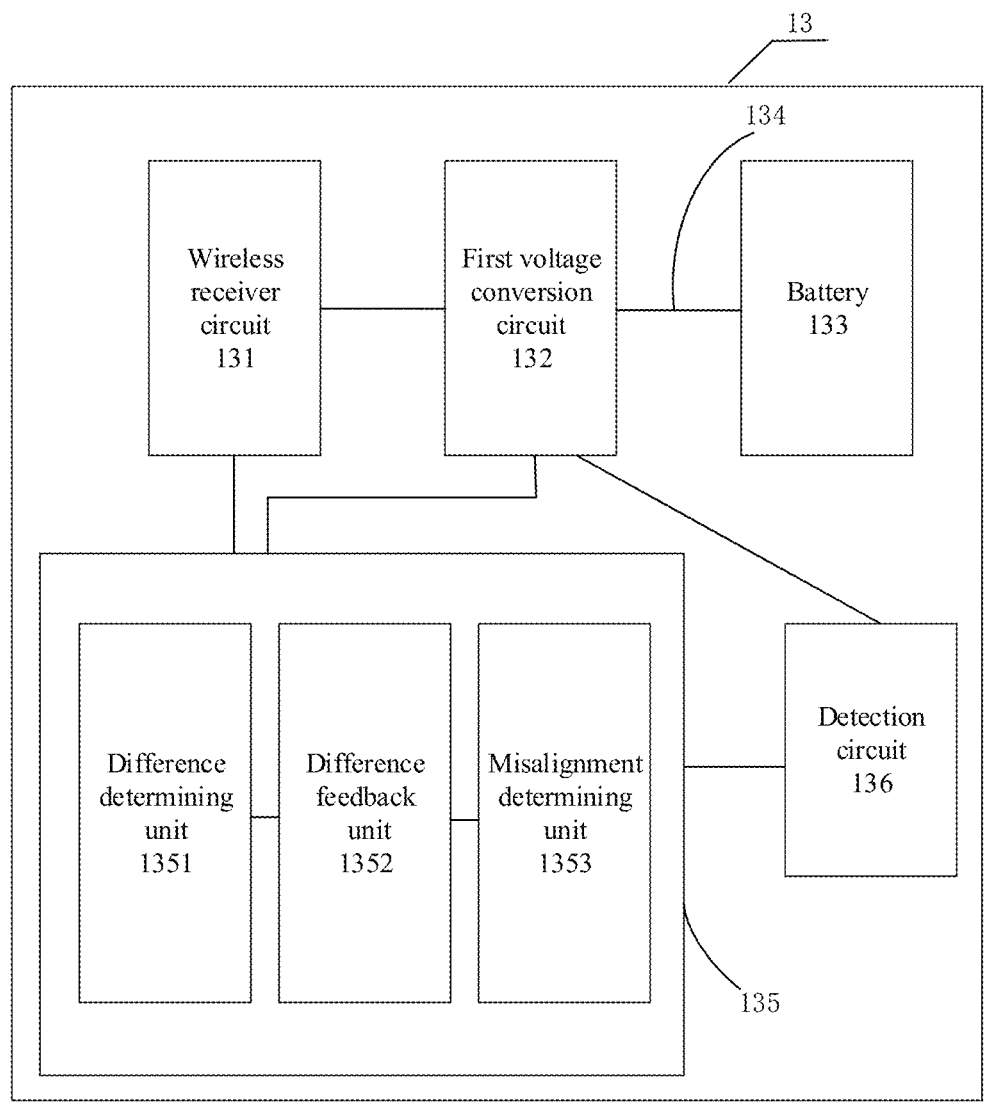
FIG. 5 is a block diagram of a device to-be-charged illustrated according to an exemplary embodiment.

In some implementations, as shown in FIG. 5, the second control module 135 may further include: a difference determining unit 1351, a difference feedback unit 1352, and a misalignment determining unit 1353. The difference determining unit 1351 is configured to determine the difference between the target output voltage and the actual output voltage. The difference feedback unit 1352 is configured to feed back the difference to the wireless charging device 12 or 22 when the difference is greater than the preset difference threshold. And the misalignment determining unit 1353 is configured to determine that the device to-be-charged 13 and the wireless charging device 12 or 22 are misaligned with each other when the difference is not equal to the difference threshold for m times in a row, where m is a positive integer greater than 1. Preferably, the difference threshold is set as 0, which is not limited in the present disclosure.

In some implementations, the second control module 135 is further configured to: after the target output voltage of the wireless receiver circuit 131 in the device to-be-charged 13 is set as the actual output voltage, determine the difference between the target output voltage and the actual output voltage; feedback the difference to the wireless charging device 12 or 22 when the difference is greater than the difference threshold; and set the target output voltage of the wireless receiver circuit 131 in the device to-be-charged 13 as being equal to the actual output voltage when the difference is not equal to the difference threshold for n times in a row, where n is a positive integer greater than 1.

In some implementations, the detection module 136 is further configured to detect the output current of the wireless receiver circuit 131 in the device to-be-charged 13 when the difference is equal to the difference threshold for n times in a row. The second control module 135 is also configured to: determine whether the output current satisfies the condition of entering the current-and-voltage adaptive procedure when the difference is equal to the difference threshold for n times in a row; and perform the voltage-rising and current-decreasing operations in the current-and-voltage adaptive procedure when the output current satisfies the condition of entering the current-and-voltage adaptive procedure.

In some implementations, the second control module 135 is further configured to: after the voltage-rising and current-decreasing operations are performed in the current-and-voltage adaptive procedure, determine the difference between the target output voltage and the actual output voltage; feed back the difference to the wireless charging device 12 or 22 when the difference is greater than the difference threshold; and decrease the charging current applied to both ends of the battery 133 in the device to-be-charged 13 when the difference is not equal to the difference threshold for x times in a row, where x is a positive integer greater than 1.

In some implementations, the second control module 135 is also configured to: after the charging current applied to both ends of the battery 133 in the device to-be-charged 13 is decreased, determine the difference between the target output voltage and the actual output voltage; feed back the difference to the wireless charging device 12 or 22 when the difference is greater than the difference threshold; and set the target output voltage of the wireless receiver circuit 131 in the device to-be-charged 13 as the actual output voltage when the difference is not equal to the difference threshold for y times in a row, where y is a positive integer greater than 1.

In some implementations, the second control module 135 is also configured to increase the charging current applied to both ends of the battery 133 in the device to-be-charged 13 when the difference is equal to the difference threshold for y times in a row.

In some implementations, the second control module 135 is also configured to: after the charging current applied to both ends of the battery 133 in the device to-be-charged is increased, determine the difference between the target output voltage and the actual output voltage; feed back the difference to the wireless charging device 12 or 22 when the difference is greater than the difference threshold; and increase continuously the charging current applied to both ends of the battery 133 in the device to-be-charged 13 when the difference is equal to the difference threshold for z times in a row, where z is a positive integer greater than 1.

Figure 6:
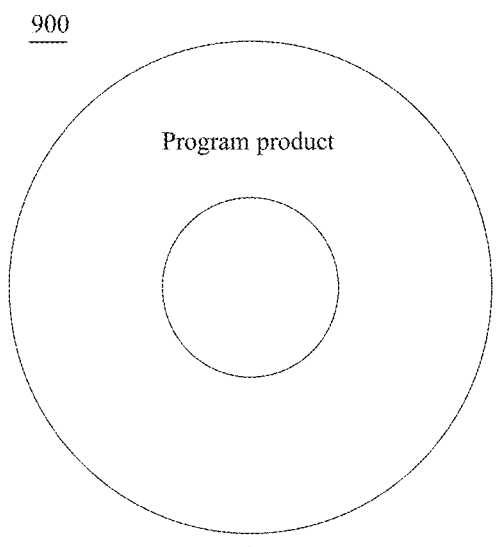
FIG. 6 is a schematic diagram of a readable storage medium illustrated according to an exemplary embodiment.

FIG. 6 is a schematic diagram of a readable storage medium illustrated according to an exemplary embodiment.

As shown in FIG. 6, a program product 900 configured to implement the above methods according to the embodiments of the present disclosure is described, which can adopt a portable compact disk read-only memory (CD-ROM) and include program codes, and can run on a terminal device. However, the program product of the present disclosure is not limited herein. In the present disclosure, the readable storage medium can be any tangible medium that contains or stores programs, and the programs can be used by or in combination with an instruction execution system, device, or equipment.

The above computer-readable medium carries one or more programs. When the one or more programs are executed by the device, the computer-readable medium is caused to implement all or part of operations of the methods of the various embodiments of the present disclosure shown in FIG. 3 and FIG. 4.

The exemplary embodiments of the present disclosure are specifically illustrated and described above. It should be understood that the detailed structure, the present disclosure is not limited by the specific structures, arrangements or implementations described herein; on the contrary, the present disclosure intends to cover various modifications and equivalents made within the spirit and scope of the appended claims.

What is claimed is:

1. A wireless charging method, applied to a device to-be-charged, wherein the device to-be-charged comprises a wireless receiver circuit and a battery, the wireless receiver circuit is configured to receive an electromagnetic signal transmitted by a wireless charging device and convert the electromagnetic signal into a direct current to charge the battery, and the method comprises:
    detecting an actual output voltage of the wireless receiver circuit in the device to-be-charged; and
    setting a target output voltage of the wireless receiver circuit in the device to-be-charged as being equal to the detected actual output voltage, in response to determining, according to the detected actual output voltage, that the device to-be-charged and the wireless charging device are misaligned with each other during a wireless charging process.

2. The wireless charging method according to claim 1, wherein the determining, according to the detected actual output voltage, that the device to-be-charged and the wireless charging device are misaligned with each other during a wireless charging process, comprises:
    determining a difference between the target output voltage and the detected actual output voltage;
    feeding back the difference to the wireless charging device, in response to determining that the difference is greater than a preset difference threshold; and
    determining the device to-be-charged and the wireless charging device are misaligned with each other, in response to determining that the difference is not equal to the difference threshold for m times in a row, where m is a positive integer greater than 1.

3. The wireless charging method according to claim 2, wherein after setting a target output voltage of the wireless receiver circuit in the device to-be-charged as being equal to the detected actual output voltage, the method further comprises:
    detecting the actual output voltage;
    determining the difference between the target output voltage and the actual output voltage;
    feeding back the difference to the wireless charging device, in response to determining that the difference is greater than the difference threshold; and
    setting the target output voltage of the wireless receiver circuit in the device to-be-charged as being equal to the actual output voltage, in response to determining that the difference is not equal to the difference threshold for n times in a row, where n is a positive integer greater than 1.

4. The wireless charging method according to claim 3, wherein in response to determining that the difference is equal to the difference threshold for n times in a row, the method further comprises:
    detecting an output current of the wireless receiver circuit in the device to-be-charged;
    performing voltage-rising and current-decreasing operations in a current-and-voltage adaptive procedure, in response to determining that the output current satisfies a condition of entering the current-and-voltage adaptive procedure.

5. The wireless charging method according to claim 4, wherein after performing the voltage-rising and current-decreasing operations in a current-and-voltage adaptive procedure, the method further comprises:
    detecting the actual output voltage;
    determining the difference between the target output voltage and the actual output voltage;
    feeding back the difference to the wireless charging device, in response to determining that the difference is greater than the difference threshold; and
    decreasing a charging current applied to both ends of the battery in the device to-be-charged, in response to determining that the difference is not equal to the difference threshold for x times in a row, where x is a positive integer greater than 1.

6. The wireless charging method according to claim 5, wherein after decreasing the charging current applied to both ends of the battery in the device to-be-charged, the method further comprises:
    detecting the actual output voltage;
    determining the difference between the target output voltage and the actual output voltage;
    feeding back the difference to the wireless charging device, in response to determining that the difference is greater than the difference threshold; and setting the target output voltage of the wireless receiver circuit in the device to-be-charged as being equal to the actual output voltage, in response to determining that the difference is not equal to the difference threshold for y times in a row, where y is a positive integer greater than 1.

7. The wireless charging method according to claim 6, wherein in response to determining that the difference is equal to the difference threshold for y times in a row, the method further comprises:
increasing the charging current applied to both ends of the battery in the device to-be-charged.

8. The wireless charging method according to claim 7, wherein after increasing the charging current applied to both ends of the battery in the device to-be-charged, the method further comprises:
detecting the actual output voltage;
determining the difference between the target output voltage and the actual output voltage;
feeding back the difference to the wireless charging device, in response to determining that the difference is greater than the difference threshold; and
continuing to increase the charging current applied to both ends of the battery in the device to-be-charged, in response to determining that the difference is equal to the difference threshold for z times in a row, where z is a positive integer greater than 1.

9. A device to-be-charged, comprising:
a battery;
a wireless receiver circuit, configured to receive an electromagnetic signal transmitted by a wireless charging device, and convert the electromagnetic signal into an output current to charge the battery;
a detection module, configured to detect an actual output voltage of the wireless receiver circuit in the device to-be-charged; and
a control module, configured to: determine, according to the actual output voltage, whether the device to-be-charged and the wireless charging device are misaligned with each other during a wireless charging process; and set a target output voltage of the wireless receiver circuit in the device to-be-charged as being equal to the actual output voltage when it is determined that the device to-be-charged and the wireless charging device are misaligned with each other.

10. The device to-be-charged according to claim 9, wherein the control module comprises:
a difference determining unit, configured to determine a difference between the target output voltage and the actual output voltage;
a difference feedback unit, configured to feed back the difference to the wireless charging device when the difference is greater than a preset difference threshold; and
a misalignment determining unit, configured to determine the device to-be-charged and the wireless charging device are misaligned with each other when the difference is not equal to the difference threshold for m times in a row, where m is a positive integer greater than 1.

11. The device to-be-charged according to claim 10, wherein the control module is further configured to: after the target output voltage of the wireless receiver circuit in the device to-be-charged is set as being equal to the actual output voltage, determine the difference between the target output voltage and the actual output voltage, feed back the difference to the wireless charging device when the difference is greater than the difference threshold, and set the target output voltage of the wireless receiver circuit in the device to-be-charged as being equal to the actual output voltage when that the difference is not equal to the difference threshold for n times in a row, where n is a positive integer greater than 1.

12. The device to-be-charged according to claim 11, wherein the detection module is further configured to detect an output current of the wireless receiver circuit in the device to-be-charged when the difference is equal to the difference threshold for n times in a row;
the control module is further configured to: when the difference is equal to the difference threshold for n times in a row, determine whether the output current satisfies a condition of entering a current-and-voltage adaptive procedure, and perform voltage-rising and current-decreasing operations in the current-and-voltage adaptive procedure when the output current satisfies the condition of entering the current-and-voltage adaptive procedure.

13. The device to-be-charged according to claim 12, wherein the control module is further configured to: after the voltage-rising and current-decreasing operations are performed in the current-and-voltage adaptive procedure, determine the difference between the target output voltage and the actual output voltage, feed back the difference to the wireless charging device when the difference is greater than the difference threshold, and decrease a charging current applied to both ends of the battery in the device to-be-charged when the difference is not equal to the difference threshold for x times in a row, where x is a positive integer greater than 1.

14. The device to-be-charged according to claim 13, wherein the control module is further configured to: after the charging current applied to both ends of the battery in the device to-be-charged is decreased, determine the difference between the target output voltage and the actual output voltage, feed back the difference to the wireless charging device when the difference is greater than the difference threshold, and set the target output voltage of the wireless receiver circuit in the device to-be-charged as being equal to the actual output voltage when the difference is not equal to the difference threshold for y times in a row, where y is a positive integer greater than 1.

15. The device to-be-charged according to claim 14, wherein the control module is further configured to increase the charging current applied to both ends of the battery in the device to-be-charged when the difference is equal to the difference threshold for y times in a row.

16. The device to-be-charged according to claim 15, wherein the control module is further configured to: after the charging current applied to both ends of the battery in the device to-be-charged is increased, determine the difference between the target output voltage and the actual output voltage, feed back the difference to the wireless charging device when the difference is greater than the difference threshold, and continue to increase the charging current applied to both ends of the battery in the device to-be-charged when the difference is equal to the difference threshold for z times in a row, where z is a positive integer greater than 1.

17. The device to-be-charged according to claim 15, wherein the battery comprises multiple cells connected in series.

18. A wireless charging system, comprising a device to-be-charged and a wireless charging device, wherein the wireless charging device is configured to convert an input electric energy into an electromagnetic signal for transmission, to perform wireless charging on the device to-be-charged, and the device to-be-charged comprises:
- a battery;
- a wireless receiver circuit, configured to receive the electromagnetic signal transmitted by the wireless charging device, and convert the electromagnetic signal into an output current to charge the battery;
- a detection module, configured to detect an actual output voltage of the wireless receiver circuit; and
- a first control module, configured to: determine, according to the actual output voltage, whether the device to-be-charged and the wireless charging device are misaligned with each other during a wireless charging process; and set a target output voltage of the wireless receiver circuit as being equal to the actual output voltage when it is determined that the device to-be-charged and the wireless charging device are misaligned with each other.

19. The wireless charging system according to claim 18, wherein the first control module comprises:
- a difference determining unit, configured to determine a difference between the target output voltage and the actual output voltage;
- a difference feedback unit, configured to feed back the difference to the wireless charging device when the difference is greater than a preset difference threshold; and
- a misalignment determining unit, configured to determine the device to-be-charged and the wireless charging device are misaligned with each other when the difference is not equal to the difference threshold for m times in a row, where m is a positive integer greater than 1.

20. The wireless charging system according to claim 19, further comprising a power supply device, configured to provide the input electric energy to the wireless charging device.

* * * * *